Feb. 14, 1928.
E. E. FULTON
PIPE BAND
Filed Oct. 22, 1925
1,659,196
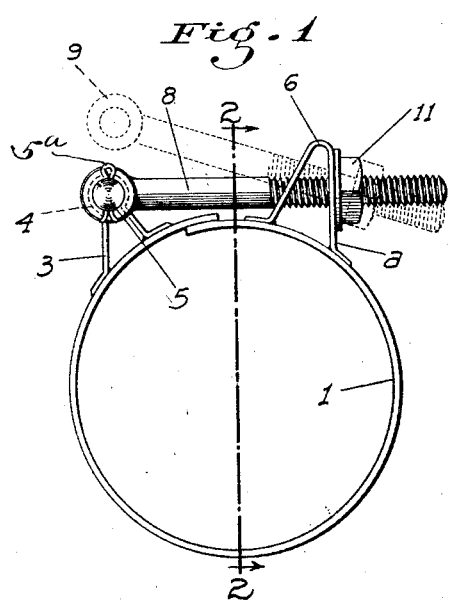
Fig. 1
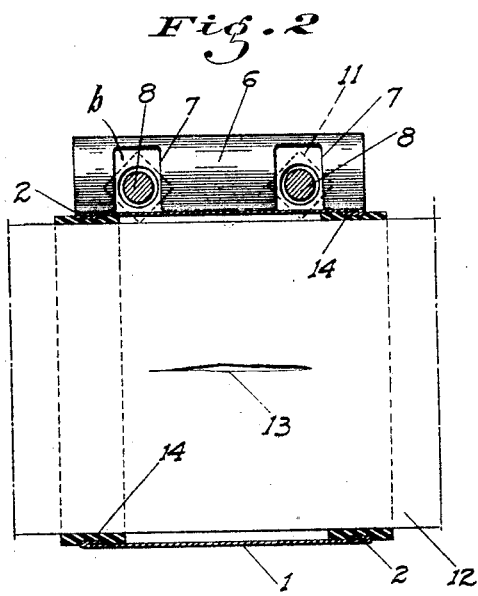
Fig. 2
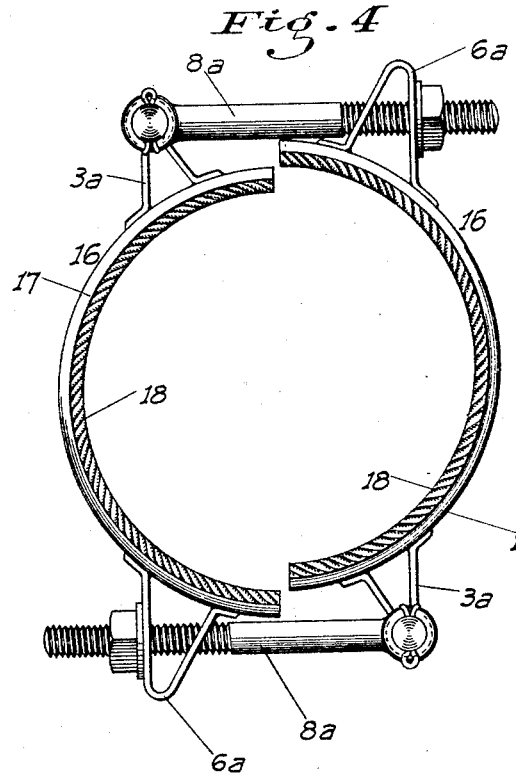
Fig. 4
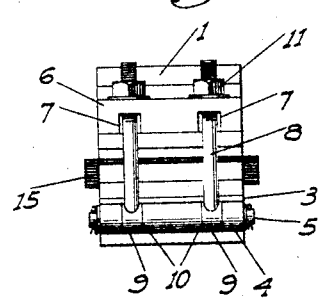
Fig. 3
Fig. 5
INVENTOR
Eric E. Fulton
BY Percy S. Webster
ATTORNEY Patented Feb. 14, 1928.

1,659,196

UNITED STATES PATENT OFFICE.

ERIC E. FULTON, OF FAIROAKS, CALIFORNIA.

PIPE BAND.

Application filed October 22, 1925. Serial No. 64,120.

This invention relates to improvements in pipe bands such as are used to place about leaky pipes to stop the leaks.

The principal object of my invention is to provide a device for the purpose which is very easily applied and which has clamping bolts mounted in such a manner that a straight and even pull may be applied to the ends of the band to draw the same together, which results in even pressure on the band all around the same.

A further object is to connect the bolts to the band in such a manner that the ends of the band may be separated the neccessary distance to enable said band to be placed around the pipe, without removing the nuts from the bolts and without taking out the bolts themselves.

The bands are used in connection with suitable water-tight packing or sealing means, and another object of my invention is to construct the band in such a manner that when cinched around a pipe, the sealing means will be firmly engaged with the pipe so that not only is leaking past said means positively prevented but any likelihood of the sealing means blowing out is eliminated.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side view of a one-piece band showing my improved clamping arrangement.

Fig. 2 is a cross section on the line 2—2 of Fig. 1, showing the band as applied to a pipe in connection with the sealing or packing means.

Fig. 3 is a top plan view of the device.

Fig. 4 is a side view of a modified or two piece type of band, particularly intended for large size pipes.

Fig. 5 is an end view of one of the band sections of the type of structure shown in Fig. 4.

Referring now more particularly to the characters of reference on the drawings, and particularly at present to Figs. 1 and 3, the numeral 1 denotes the band slit transversely, and with the ends adapted to overlap as shown in Fig. 1. The edges of the band are turned over inwardly all around to form continuous beads 2.

Projecting outwardly from the band adjacent one end is a bearing lug 3, whose outer portion 4 is circular in cross section and with its axis parallel to that of the band. The portion 4 forms the bearing for a removable pin 5.

Projecting outwardly from the band adjacent the opposite end thereof is a transverse bolt supporting lug 6, provided with transversely spaced and vertical slots 7 on its face nearest the lug 3. The lug is preferably made of a single piece of sheet metal, bent to be substantially V-shaped, and with its outer face "$a$" substantially in a plane at right angles to a line projected through the center of pin 5 and slots 7.

Between the lugs bolts 8 extend. These bolts have eyes 9 on one end to receive the pin 5, the eyes fitting in notches 10 cut in the top of the lug 3 to a sufficient depth to enable the bolts to be lowered so that the pin will engage the eyes. Nuts 11 on the opposite ends of the bolts then bear against the face "$a$" of the lug 6, there being orifices "$b$" in the face "$a$" through which the bolts project, such orifices being of a lesser diameter than the eyes 9 to prevent the bolts dropping off of the clamp when the pin 5 is removed from such eyes 9.

It will therefore be seen that when the nuts are tightened up a straight and even pull is applied to the band adjacent its ends, so that said band will be cinched evenly and firmly about a pipe 12 to which the band may be applied. Also the bolts being straight throughout, no bending strain is placed thereon.

The slots 7 are completely closed around their edges. Thus when the clamp is assembled the bolts 8 are first set through the slots 7 and orifices "$b$" and the nuts 11 mounted on the bolts. Thereafter the nuts and bolts cannot be lost off of the clamps as neither the nuts 11 or eyes 9 can pass through the orifices "$b$".

The operation of placing and assembling the band around the pipe is carried out as follows:—

The split band is opened and fitted around the pipe and strips of rubber or like packing material 14 are placed about the pipe in line with and project slightly to each side of the beads 2 so that as the band is cinched up the packing strips will be compressed by the beads intermediate their edges and leave the inner portions of substantially normal thickness. This will prevent any tendency of the packing strips to blow outwardly under pressure and hence will prevent leakage past the band. Another strip of rubber or like packing material 15 is placed between the overlapping portions of the split band as the same are drawn together, thus making a leak-proof joint at this point also.

When the band and packing strips are all in position on the pipe the eyes 9 are moved into alinement with the bearing 4. The pin 5 is then passed through the bearing 4 and eyes 9 and locked in position by cotter pins 5ª. The nuts 11 are then advanced on the bolts 8 to draw the ends of the split band together to fix the clamp on the pipe as tightly as desired.

The clamps are designed primarily for use on large pipe connected with water systems of various kinds where it is essential that no accidental loosening of the clamp will be possible while at the same time a quick emergency release of the clamp is sometimes required. These two conditions are cared for in my structure by having the bolt and nut enclosed within one lug and secured to but quickly releasable from the other through the medium of the pin 5 and cotter pins 5ª.

In the modified form of structure shown in Figs. 4 and 5, the band is formed of two sections 16, each having a pair of lugs 3ª and 6ª, corresponding to the lugs 3 and 6 on the first described type, to receive the oppositely disposed clamping bolts 8ª.

These band sections are provided with continuous circular and concave grooves 17 adjacent their outer edges, forming seats for packing elements such as a layer or rope 18 or the like which is tarred or otherwise cemented in place in the grooves.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A pipe clamp comprising a split band, draw lugs on the band adjacent the ends thereof, one lug having a transverse orifice and the other having a bearing sleeve, a bolt to project through the orifice and threaded to carry a nut at one end and having an eye at the other end to aline with the bearing sleeve, and a pin adapted to be removably positioned through the bearing sleeve and eye.

2. A pipe clamp comprising a split band, draw lugs on the band adjacent the ends thereof, one lug having a transverse orifice and the other having a bearing sleeve, a bolt to project through the orifice and threaded to carry a nut at one end and having an eye at the other end to aline with the bearing sleeve, a pin adapted to be removably positioned through the bearing sleeve and eye, the free ends of the pin projecting beyond the ends of the bearing sleeve and having orifices in their projecting ends, and cotter keys removably mounted through the orifices.

In testimony whereof I affix my signature.

ERIC E. FULTON.